Nov. 19, 1929.  W. D. BELL  1,736,644
GREASE GUN
Filed June 28, 1926  2 Sheets-Sheet 1
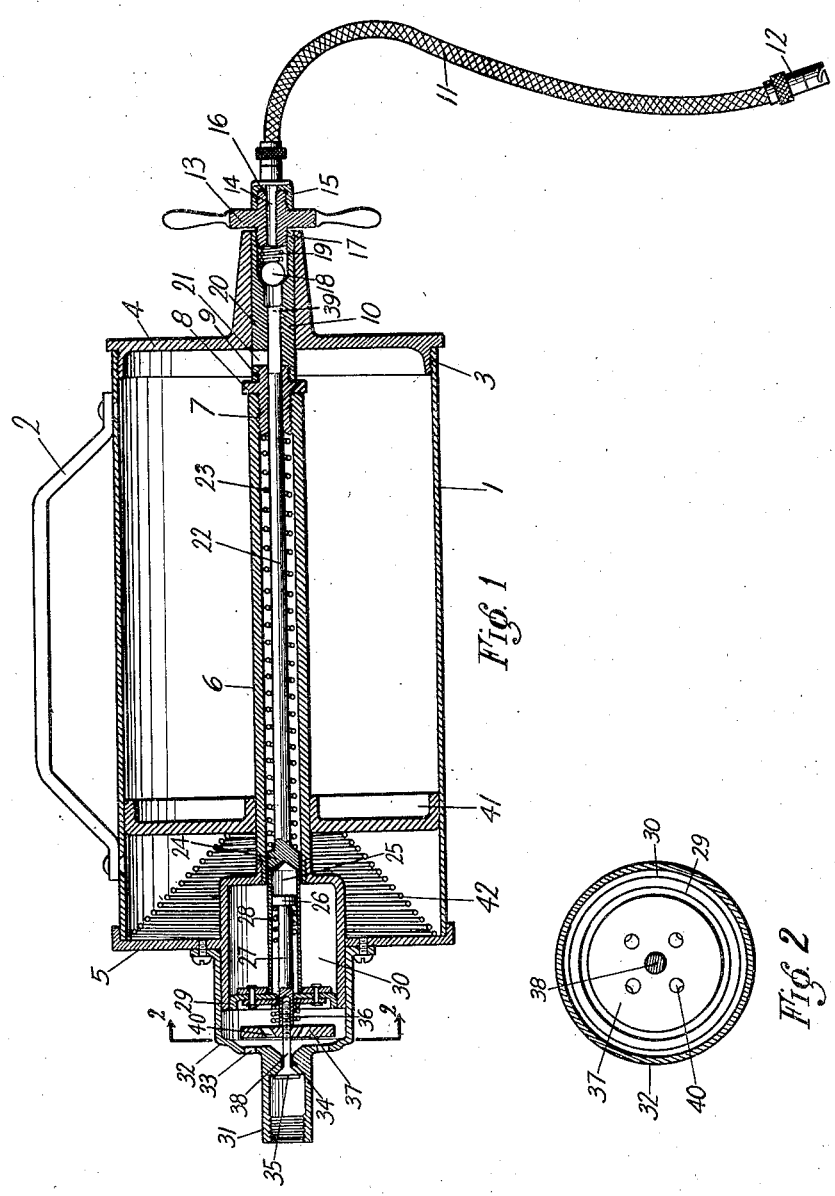
William D. Bell
INVENTOR.
BY Edwin P. Corbett
ATTORNEYS.

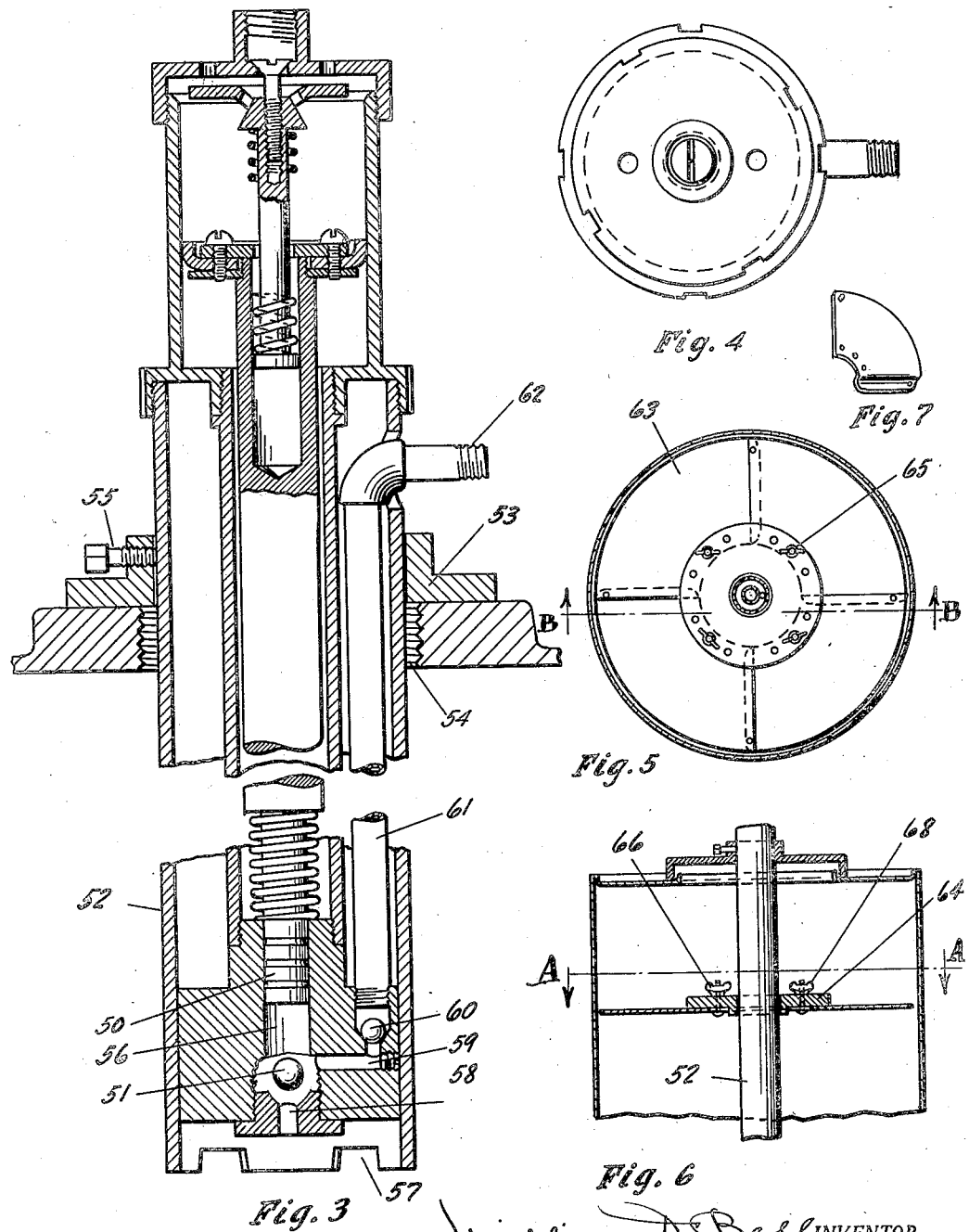

Patented Nov. 19, 1929

1,736,644

UNITED STATES PATENT OFFICE

WILLIAM D. BELL, OF COLUMBUS, OHIO, ASSIGNOR OF ONE-FOURTH TO EDWIN P. CORBETT, OF COLUMBUS, OHIO

GREASE GUN

Application filed June 28, 1926. Serial No. 119,122.

My invention relates to grease guns and has to do with that class of devices which are utilized to direct lubricant to the various parts of an automobile or other machine which requires lubrication. It has particular reference to those devices which force the lubricant into the proper conduits and crevices under pressure.

I have provided a novel form of grease gun which is particularly adapted for use in a filling station or wherever compressed air is available. This grease gun is air-operated and one of the important features of it resides in the fact that it will continue to discharge the lubricant under pressure as long as air under pressure is introduced into it. Another feature of this invention resides in the fact that the normal operation of the device serves to conduct the lubricant from a storage chamber therein to a discharge chamber under the influence of a partial vacuum created in such discharge chamber.

My invention preferably takes the form of a discharge chamber and a plunger reciprocating therein, this plunger being automatically reciprocated as long as air under pressure is introduced into my device. It also comprises a lubricant storage chamber which is in constant communication with the discharge chamber, except for a portion of the actual discharging period. My device also embodies a means for ensuring that the lubricant in the storage chamber is properly maintained in compact form adjacent to the inlet into the discharge chamber.

I have also embodied many of the elements of my pumping apparatus in a mechanism which is adapted to be inserted directly into a drum of grease such as is commonly sold to a filling station. This combination has the advantage of enabling the filling station attendant to omit filling of the grease gun from time to time because it is only necessary for him to introduce the inlet end of the apparatus into the drum to the proper extent and to attach the air connection to the source of compressed air. Then, the pumping action will commence and will serve to draw successive charges of the grease from the drum and to eject it from the gun. With this gun properly connected to the lubricating duct of an automobile, or other apparatus, the successive charges of lubricant will be delivered to the proper parts.

The preferred embodiment of my invention is shown in the accompanying drawings wherein similar characters of reference designate corresponding parts and wherein Figure 1 is a longitudinal section of a grease gun which is adapted to be filled from time to time and which embodies features of my invention.

Figure 2 is a section taken on line 2—2 of Figure 1.

Figure 3 is a vertical section of that type of my invention which is adapted to be mounted in a grease drum of the usual type.

Figure 4 is a plan view of the device shown in Figure 3 as it appears removed from the grease drum.

Figure 5 is a section taken on line A—A of a grease drum with my device mounted therein.

Figure 6 is a section taken on line B—B of Figure 5.

Figure 7 is a perspective view of one of my follower plates.

In the drawings, with particular reference to Figures 1 and 2, I have shown a grease container 1 having a handle 2 thereon for ready transportation. This grease container is internally threaded at one end as at 3 for the reception of the external threads of a flanged cap 4. The opposite end of this container is provided with a cap 5.

Concentrically located within the grease container 1 is a tube 6 which extends for a substantial portion of the length of the container and which is threaded at one end as at 7 for the reception of the threads of a flanged thimble 8. This flanged thimble 8, likewise, carries a threaded extension 9 fitting into the threaded end of a tube 10 that in turn connects at its outer end with a flexible hose 11 having a coupling 12 for connection to the fittings of a lubricating system.

Interposed between the hose 11 and the tube 10 is a handle member 13 containing a bore 14 that effects communication between the bore and the tube 10 and the hose 11. This handle member 13 is threaded into the cap coupling 15 of the hose by means of a reduced extension 16 on the handle member and is also threaded into an enlargement of the bore in the tube 10 by means of a reduced threaded extension 17.

Located between the inner end of the reduced threaded extension 17 and the smaller bore of the tube 10 is a ball valve 18 normally held in position to close this small bore of the tube 10 by means of a coil spring 19.

This small bore of the tube 10 constitutes the discharge chamber of my grease gun. This discharge chamber is connected to the grease magazine 20 of my grease gun by means of a normally open port 21.

A plunger 22 is mounted for reciprocation within the small bore of the tube 10, that is, within the discharge chamber. This plunger is normally maintained in retracted position by means of a coil spring 23 which surrounds the plunger and bears at one end against the thimble 8 and at the other end against an enlargement 24 integrally formed upon the plunger.

This enlargement 24 is bored as at 25 for the reception of a stem 27 having a collar 26. This stem 27 is, likewise, surrounded by a coil spring 28 fitting within the bore of the enlargement 24 and bearing at one end against the collar 26. A packing cup structure 29 partially closes the bore 25 of the enlargement 24 with the exception of an opening through which passes the stem 27 of the plunger.

The packing cup structure 29 is in reality a piston operating in a cylinder 30 whose inner end has a screw connection to the tube 6. The application of air under pressure to the outer face of the piston 29 will result in the forcing of this piston inwardly in its cylinder 30 and, inasmuch as this piston is connected to the enlargement 24 of the plunger 22, this inward movement will cause this plunger 22 to enter the discharge chamber and force the grease therefrom past the ball valve 18 and through the tube 11 into the fitting and thence to the parts to be lubricated.

Application of air pressure to the air under pressure is admitted to the outer face of the piston structure 29 through the coupling 31, which may be connected to the so-called "free air" device of the average filling station. This coupling 31 forms a part of a cap 32 which fits over the otherwise open end of the cylinder 30 and which is provided with air outlet ports 33. An air duct 34 is formed in the base of this coupling 31 for the admission of air to the outer surface of the piston structure 29. This duct 34 is designed to be closed by a valve 35 which has a threaded connection with the stem 27.

The spring 23 normally holds the plunger 22 retracted and, in this retracted position, the valve 35 is held open. The coil spring 36 bearing upon the piston structure 29 at one end and bearing upon the plate 37 carried by the valve stem 38 at the other end tends to cause this valve 35 to travel with the plunger 22.

When air is introduced into the coupling 31, it becomes immediately effective upon the piston structure 29 and, therefore, forces this piston structure inwardly into the cylinder 30. In doing this, it moves the plunger 22 into the discharge chamber 39. As explained, this results in the expulsion of the lubricant from this discharge chamber. As this downward movement continues, the valve 35 is drawn into closing relation into its duct 34 and, at the same time, the plate 37 is moved from position, opening exhaust ports 33. This shuts off the flow of air under pressure into the cylinder 30 and the air which has been introduced to move the piston 29 is exhausted through the outlet ports 33 and the spring 23, which has been compressed by this inward movement, commences to expand and, in the course of this expansion, moves the piston 29 to its outermost position. This movement results in bringing the plate 37 into a position where it closes the air outlet ports 33 in the cap member 32 at the same time the valve 35 is raised from its seat and permits access of air under pressure through the duct 34 and through the ports 40 in the plate 37. Thus, it will be obvious that continuous reciprocation takes place as long as air under pressure is being introduced into the coupling 31 and an outlet for the grease provided. It is important to notice that the withdrawal of the plunger 22 serves to produce a partial vacuum in the chamber 39 and that facilitates the entrance of the lubricant into the chamber magazine 20.

The entrance of this lubricant into the discharge chamber from the magazine is further facilitated by means of a follower 41 which is slidable upon the tube 6 and which is continuously forced toward the inlet port end of the magazine by means of a coil spring 42.

Referring to that form of my device which is adapted to take the lubricant directly from the drum, this form being shown best in Figures 3, 4, 5 and 6, it will be observed that the valve structure for automatically controlling reciprocation of the discharging plunger is substantially identical with the valve structure shown in Figures 1 and 2.

The actual mechanism for effecting the discharge of the lubricant from its discharge chamber is also substantially identical and, therefore, need not be described in detail. For instance, I utilize a plunger 50 which is practically identical with the plunger 22 of the device shown in Figure 2. I also utilize a check valve 51 which is the equivalent of the check valve 18.

Instead of the magazine 20, I use an enclosing casing 52 which extends into the drum through the opening normally provided therein and which is designed to terminate closely adjacent to the bottom of the drum.

This casing 52 is preferably extended through a collar 53 resting upon the opening 54 of the drum. It is capable of adjustment to different depths by means of a set-screw 55.

This casing 52 does not constitute a magazine but the lubricant is drawn into the discharge chamber 56 through the cutaway portion 57 in the lower end of the casing, through the duct 58 and past the check valve 51. When the plunger 50 is forced downwardly to discharge the lubricant from the discharge chamber, it forces this lubricant through a passage 59 past a check valve 60 and through a pipe 61 that is threaded at its outer end as at 62 for the reception of a flexible hose similar to that shown at 11 in Figure 1.

As shown in Figures 5 and 6, I preferably use a follower plate which is slidably mounted upon the casing 52. This follower plate is intended to ride upon the lubricant in the drum and force it downwardly. It is desirably made up of a plurality of sections 63 which are overlapping and which are secured through a central collar 64 by means of bolts 65 and nuts 66. The shape of the individual sections is shown in Figure 7.

This follower plate ensures a uniform distribution of atmospheric pressure over the entire surface so that, as grease is pumped out of the bottom of the drum, the grease will feed uniformly from above. Of course, this follower plate will move down within the drum as the grease is pumped out.

Having thus described my invention, what I claim is:

1. A means for transferring a lubricant from the original container to the point of use comprising a chamber with an inlet opening so located that it will be normally immersed in the lubricant when inserted in the container, a means for drawing the lubricant into said chamber by suction and for expelling the lubricant from said chamber, said means being resiliently movable to produce the suction, and movable by compressed fluid to produce the expelling power, and means for continuously and automatically operating said last named means.

2. A means for delivering grease to a point to be lubricated comprising a container, a grease gun having a main body portion adapted to be inserted into said container and having a suction inlet adapted to be submerged by such insertion, a portion connectible to a source of compressed fluid, a means resiliently movable to produce suction for drawing the grease into the gun, and movable by compressed fluid to produce expelling pressure to expel the grease so drawn into the gun, and a discharge connection for application to a lubricating duct.

3. A means for transferring lubricant from the original container to a point to be lubricated upon a vehicle comprising a main body portion adapted to be inserted in said container and having a suction inlet adapted to be submerged by such insertion, a lubricant chamber, means resiliently movable to produce suction for drawing the grease into said chamber, and movable by compressed fluid to produce expelling pressure to expel the grease from said chamber, means for successively and automatically opening and closing the inlet to an outlet from said chamber, and means for conducting said lubricant from said chamber to the point to be lubricated.

4. Means for removing grease from a container to a point of use comprising a substantially cylindrical casing adapted to be inserted into a grease container, said casing enclosing a pump cylinder, pump operating mechanism, and a discharge duct leading from the pump cylinder to the point of discharge, and fluid pressure operating means mounted upon the upper end of said casing and connected with said pump operating mechanism.

5. Means for removing grease from a container to a point of use comprising a substantially cylindrical casing having a chamber with an inlet opening so located that it will be normally immersed in the lubricant when inserted in the grease container, said casing enclosing a pump cylinder, pump operating mechanism, and a discharge duct leading from the cylinder to the point of discharge, and fluid pressure operating means mounted upon the upper end of said casing, said pump operating mechanism being resiliently movable to produce suction for drawing the grease through the inlet into said chamber, and movable by compressed fluid to produce the expelling pressure to expel the lubricant from said chamber.

In testimony whereof I hereby affix my signature.

WILLIAM D. BELL.

CERTIFICATE OF CORRECTION.

Patent No. 1,736,644.             Granted November 19, 1929, to

WILLIAM D. BELL.

It is hereby certified that error appears in the printed specification of the above numbered patent requiring correction as follows: Page 3, line 80, claim 3, for the word "an" read "and"; and that the said Letters Patent should be read with this correction therein that the same may conform to the record of the case in the Patent Office.

Signed and sealed this 24th day of June, A. D. 1930.

(Seal)                                         M. J. Moore,
                                                  Acting Commissioner of Patents.